United States Patent [19]

Hayashi et al.

[11] Patent Number: 5,535,308
[45] Date of Patent: Jul. 9, 1996

[54] PRINTING METHOD FOR USE WITH DOT PRINTER

[75] Inventors: Mikio Hayashi; Hiroshi Sato; Masahiro Nishida; Keiichiro Takahashi, all of Tokyo, Japan

[73] Assignee: Seikosha Co., Ltd., Tokyo, Japan

[21] Appl. No.: 461,219

[22] Filed: Jun. 5, 1995

Related U.S. Application Data

[63] Continuation of Ser. No. 190,770, Feb. 2, 1994, which is a continuation of Ser. No. 985,519, Dec. 2, 1992, which is a continuation of Ser. No. 697,125, May 8, 1991, which is a division of Ser. No. 622,992, Dec. 6, 1990, abandoned.

[30] Foreign Application Priority Data

Dec. 6, 1989 [JP] Japan ................... 1-316964

[51] Int. Cl.$^6$ ........................... G06K 15/00
[52] U.S. Cl. ........................... 395/108; 395/105
[58] Field of Search .............. 395/101, 102, 395/108, 107, 109, 117, 105; 346/76.1, 134; 347/180, 181, 182, 131; 358/431, 451, 428

[56] References Cited

U.S. PATENT DOCUMENTS

| | | | |
|---|---|---|---|
| 4,216,480 | 8/1980 | Buehner et al. | 346/75 |
| 4,683,479 | 7/1987 | Horiya et al. | 346/76 PH |
| 5,016,195 | 5/1991 | Wakp | 395/117 |

FOREIGN PATENT DOCUMENTS

| | | | |
|---|---|---|---|
| 0234018 | 9/1987 | European Pat. Off. | 395/101 |
| 0264265 | 4/1988 | European Pat. Off. | 395/101 |
| 0326295 | 8/1989 | European Pat. Off. | 395/101 |
| 0331033 | 9/1989 | European Pat. Off. | 395/101 |
| 6179673 | 4/1986 | Japan . | |
| 61-206663 | 9/1986 | Japan . | |

OTHER PUBLICATIONS

Patent Abstracts of Japan, vol. 13, No. 183 (M-820) (3531) 28 Apr. 1989, & JP-A-1 104 049 (Oki Electric Ind Co Ltd) 18 Jan. 1989.
Hewlett Packard Journal, vol. 39, No. 5, Oct. 1989, Palo Alto, CA, USA pp. 76-80, May, J. D. et al., "Data to Dots in the HP DeskJet Printer".

*Primary Examiner*—Arthur G. Evans
*Attorney, Agent, or Firm*—Jordan and Hamburg

[57] ABSTRACT

A printing method to increase the printing speed of a dot printer. Before printing on the basis of the dot data representative of an original dot pattern showing fonts, graphics and the like, the original dot pattern is converted by converting M ($M \geq 3$) dots successive in the line direction into N ($M > N \geq 2$, $M \neq 2N$) dots. Then, printing is performed on the basis of the thus converted dot data. In a modification, conversion is performed by converting each dot into n ($n \geq 2$) successive intermediate dots in the line direction and when 2n or more intermediate dots are successive, selecting every m {$(2n-1) \geq_m \geq (n+1)$}-th intermediate dot. In another modification, pattern conversion is effected by converting each dot into n ($n \geq 2$) successive intermediate dots, in a zone where printing is possible at the same dot interval as that of the original dot pattern, selecting only dots out of the intermediate dots that are arranged at the same dot interval as that of the original dot pattern, and in the other zone, selecting every m {$(2n-1) \geq_m \geq (n+1)$}-th intermediate dot.

10 Claims, 9 Drawing Sheets

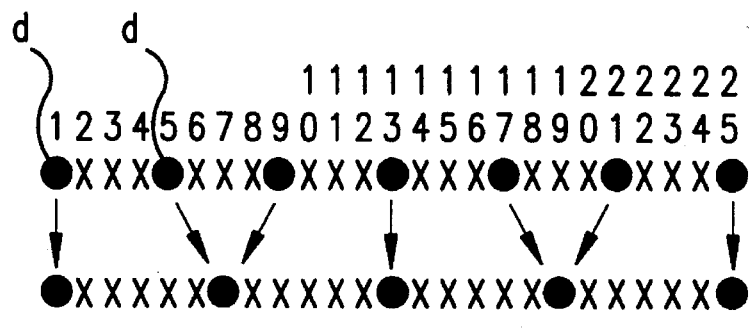
FIG.3(a)
FIG.3(b)
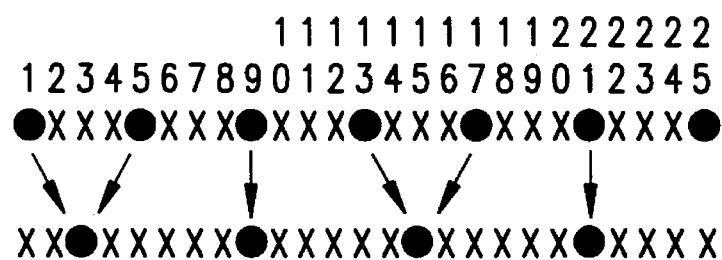
FIG.6
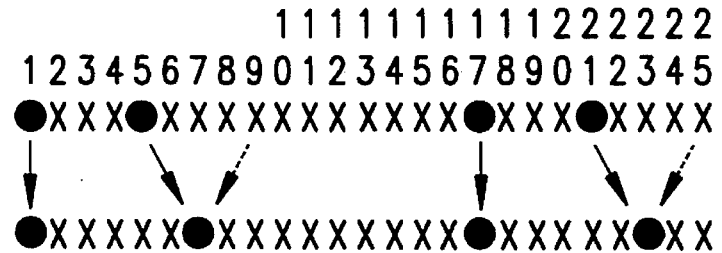
FIG.7

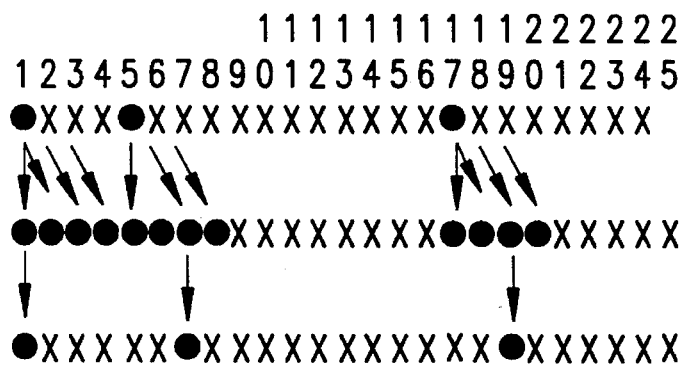
FIG. 9(a)
FIG. 9(b)
FIG. 9(c)
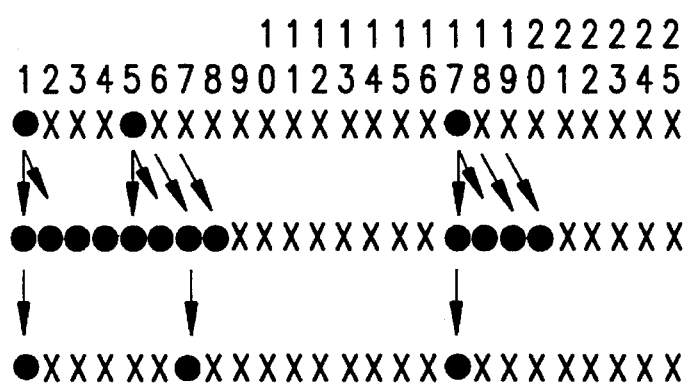
FIG. 10
FIG. 12(a)
FIG. 12(b)
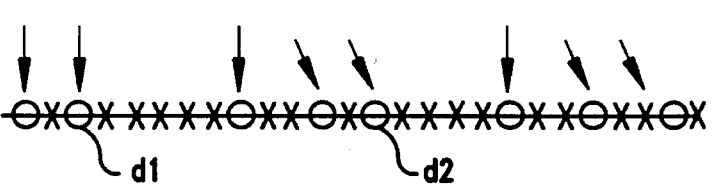
FIG. 12(c)

FIG.16(a) -o×××o××××××o×××o×××-

FIG.16(b) -ooooooooo×××ooooooooooo-

PRINTING METHOD FOR USE WITH DOT PRINTER

This is a continuation of application Ser. No. 08/190,770, filed Feb. 2, 1994, which is a continuation of application Ser. No. 07/985,519 filed Dec. 2, 1992, which is a continuation of Ser. No. 07/697,125 filed May 8, 1991, which is a division of Ser. No. 07/622,992 filed Dec. 6, 1990, abandoned.

BACKGROUND OF THE INVENTION

Hitherto, to attain high-speed printing using a wire dot printer, for example, a method was known (see, for example, Japanese Patent Laid-Open No. 60-73852) which comprised the steps of generating a secondary dot pattern from an original dot pattern showing fonts and the like by removing every other dot from the original dot pattern, and scanning a print head on the basis of the secondary dot pattern at a speed 2 times faster than usual to attain printing.

According to the method comprising the steps of converting the original dot pattern into the secondary dot pattern by removing every other dot out of the original dot pattern and performing printing on the basis of the secondary dot pattern, although the printing speed is doubled, the thus printed doe pattern is significantly distorted as compared with the original dot pattern, resulting in a poor quality of printing,

SUMMARY OF THE INVENTION

It is an object of the present invention to provide a printing method for use with a dot printer which can increase the printing speed with little deterioration in printing quality.

To accomplish the foregoing object, the present invention provides a printing method which comprises the steps of receiving the dot data representative of an original dot pattern showing fonts, graphics and the like; converting the pattern of the original dot pattern by converting M ($M \geq 3$) successive dots in the line direction to N ($M > N \geq 2, M \neq 2N$) dots; and performing printing on the basis of the thus converted dot data. Specifically, printing is performed while scanning a print head at a speed faster than usual, or printing is performed while scanning the print head at a speed M/N times faster than usual. In a modification, the foregoing object can also be accomplished by a printing method which comprises the steps of receiving the dot data representative of an original dot pattern showing fonts, graphics and the like; converting the pattern of the original dot pattern by converting each dot to n ($n \geq 2$) intermediate successive dots in the line direction and when 2n or more intermediate dots are successive, selecting every m $\{(2n-1) \geq_m \geq (n+1)\}$-th intermediate dot; and performing printing on the basis of the thus converted dot data. Specifically, printing is performed while scanning a print head at a speed faster than usual. In another modification, the foregoing object can also be accomplished by a printing method which comprises the steps of receiving the dot data representative of an original dot pattern showing fonts, graphics and the like; when printing is to be performed at a speed faster than the moving speed of a print head attained when the original dot pattern is printed, converting the pattern of the original dot pattern by converting each dot into n ($n \geq 2$) successive intermediate dots, in a zone where printing is possible at the same dot interval as that of the original dot pattern, selecting only dots from the intermediate dots that are arranged at the same dot interval as that of the original dot pattern, and in the other zone, selecting every m $\{(2n-1) \geq_m \geq (n+1)\}$-th intermediate dot; and performing printing on the basis of the thus converted dot data.

BRIEF DESCRIPTION OF THE DRAWINGS

FIG. 3 is a diagram explanatory of the first operation mode of the system shown in FIG. 1;

FIGS. 6 and 7 are diagrams explanatory of the first operation mode of the system shown in FIG. 1;

FIGS. 9 and 10 are diagrams explanatory of the second operation mode of the system shown in FIG. 1;

FIG. 12 is diagram explanatory of the third operation mode of the system shown in FIG. 1;

FIG. 16 is a diagram explanatory of the third operation mode of the system shown in FIG. 1.

DESCRIPTION OF THE PREFERRED EMBODIMENTS

Figure 1:
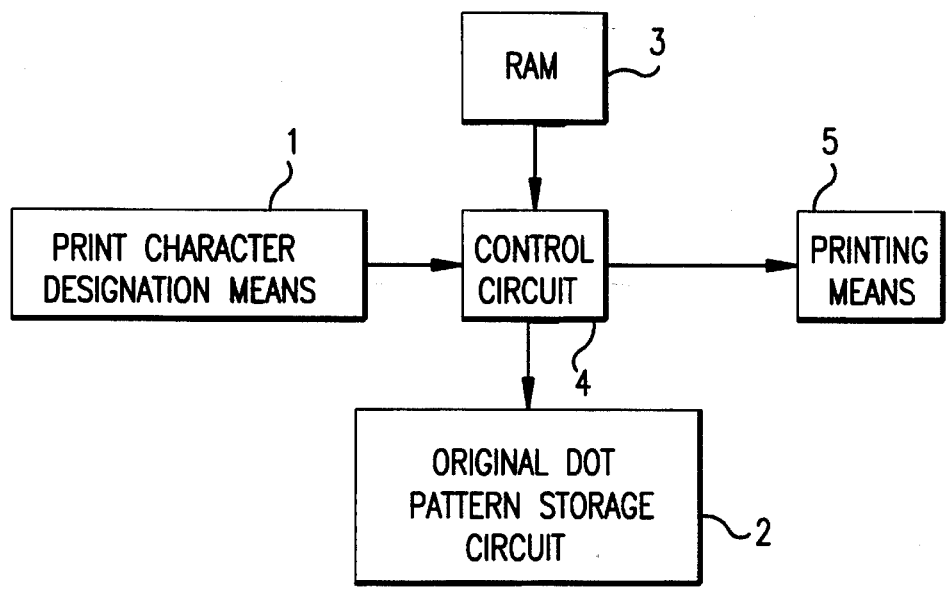
FIG. 1 is a block diagram showing a system according to the present invention.

Embodiments of the present invention will now be described with reference to the drawings. In FIG. 1, 1 is a print character designating means such as a personal computer, 2 is an original dot pattern storage circuit comprised of a font ROM in which the dot data representative of a plurality of original dot patterns showing letters, numerals, symbols and the like is stored, 3 is a RAM for temporarily storing both the dot data representative of an original dot pattern read from the original dot pattern storage circuit 2 and the dot data representative of a secondary dot pattern obtained by converting the original dot pattern in accordance with a given algorithm, 4 is a control circuit for reading the dot data from the original dot pattern storage circuit 2, converting the pattern of the original dot pattern, controlling printing, and so on, and 5 is a printing means comprising a print head or the like for performing printing on the basis of the dot data stored in the RAM 3.

When high-speed printing is to be performed, a mode switch (not shown) is turned to select a high-speed print mode, and then the print character designating means 1 is operated to designate print characters. Upon designation of the print character, the dot data representative of an original dot pattern corresponding to the designated print character is read from the original dot pattern storage circuit 2, the original dot pattern is converted in pattern in accordance with a given algorithm by the control circuit 4, and is stored in the RAM 3. Then, printing is performed by the printing means 5 on the basis of the dot pattern stored in the RAM 3.

Figure 2:
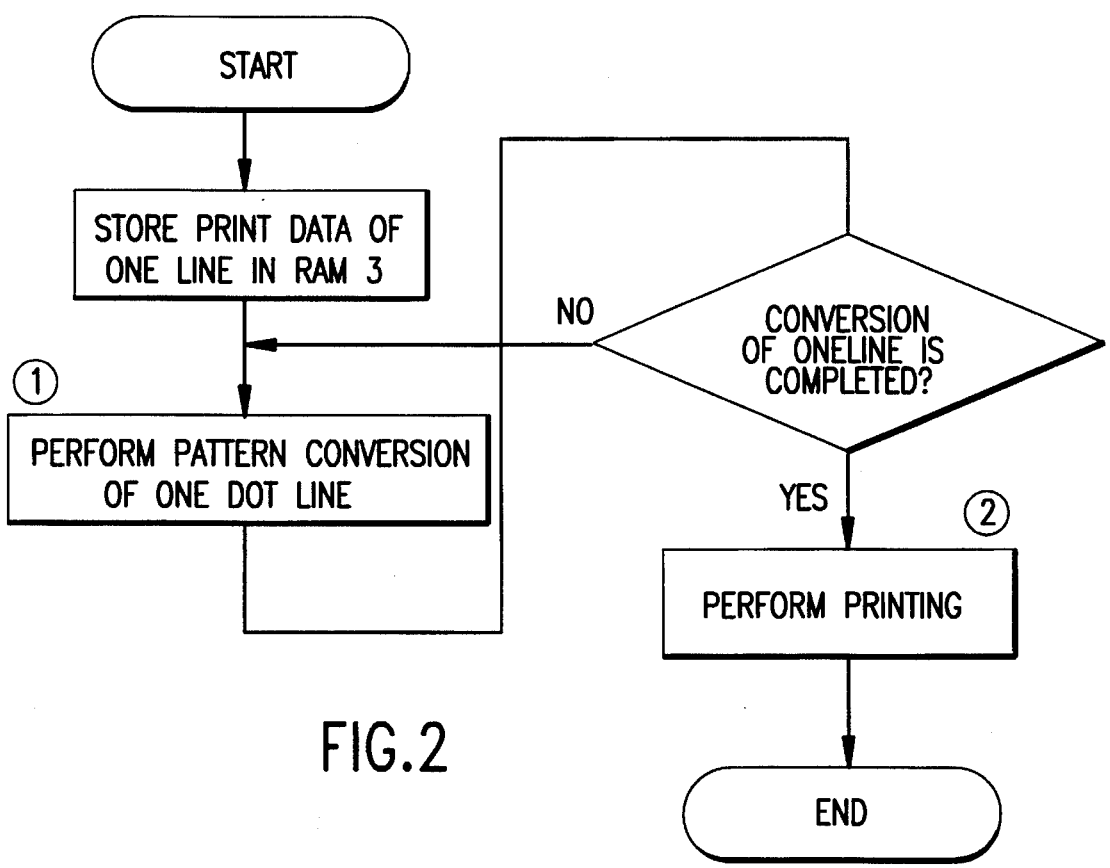
FIG. 2 is a flowchart showing a first operation mode of the system shown in FIG. 1.

A first embodiment of the process of converting the pattern of the original dot pattern by the control circuit 4 will now be described with reference to the flowchart of FIG. 2.

Assume that the dot data representative of one dot line of the original dot pattern, corresponding to the designated character and read from the original dot pattern storage circuit 2, is stored in the RAN 3 in developed form as shown in FIG. 3(*a*) so that the 1st, 5th, 9th . . . dot positions have individual dots d . . . d. With respect to the dot data, first, a check is made to determine whether or not a dot is present at the first dot position. When a dot is present, it is retained there. Then, a check is made to determine if dots are present at the subsequent two dot positions (5th and 9th dot positions). When a dot is present at at least one of the two dot positions, a dot is generated at the middle position between the two dot positions. In this way, three dots are converted into two dots. The foregoing processing is repeated with respect to subsequent dots, so that the original dot pattern of one dot line shown in FIG. 3(*a*) is converted into the arrangement of FIG. 3(*b*) whose dot interval is 1.5 times longer (step 1).

When the pattern of all dot lines is converted entirely, the print head is scanned on the basis of the thus converted dot data at a speed 1.5 times faster than usual, so that printing elements such as printing wires are driven at the maximum response frequency of the usual printing (step 2).

In this way, letters and the like designated by the print character designating means i are printed at a speed 1.5 times faster than usual.

Figure 4:
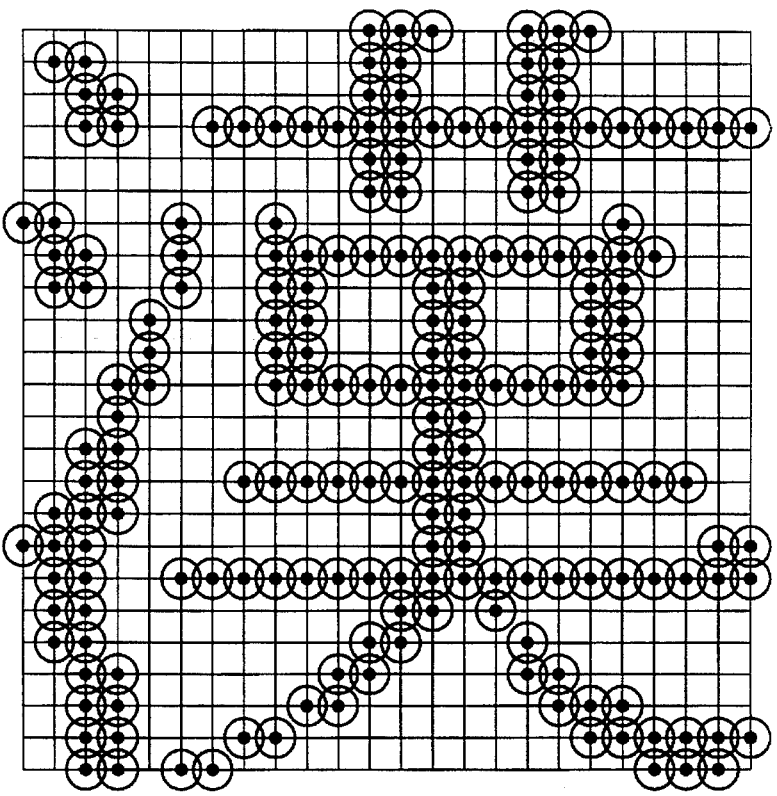
FIG. 4 is a diagram showing a printed example based on an original dot pattern.
Figure 5:
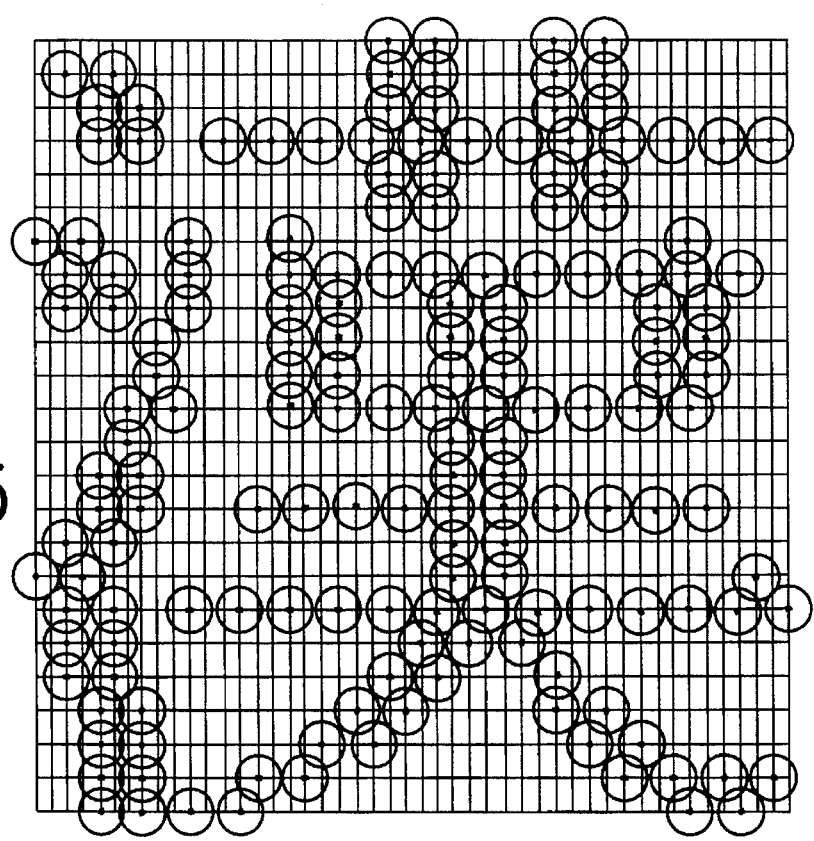
FIG. 5 is a diagram showing a printed example based on the first embodiment.

FIG. 4 shows a printed example based on the original dot pattern, and FIG. 5 shows a printed example based on the secondary dot pattern obtained by converting the original dot pattern in accordance with the first embodiment.

Although the first embodiment converts the pattern starting with the process of retaining a dot there, conversion may be performed starting with the process of generating a dot at the middle position between two successive dot positions as shown in FIG. 6.

Although the first embodiment converts the pattern in such a manner that the first process of retaining a dot as it is and the second process of generating a dot at the middle position between two successive dot positions are alternated, conversion may be performed in such a manner that when one or more dot positions have no dot, a then-appearing dot is retained there, and when at least one of subsequent two dot positions has a dot, a dot is generated at the middle position between them as shown in FIG. 7.

Figure 8:
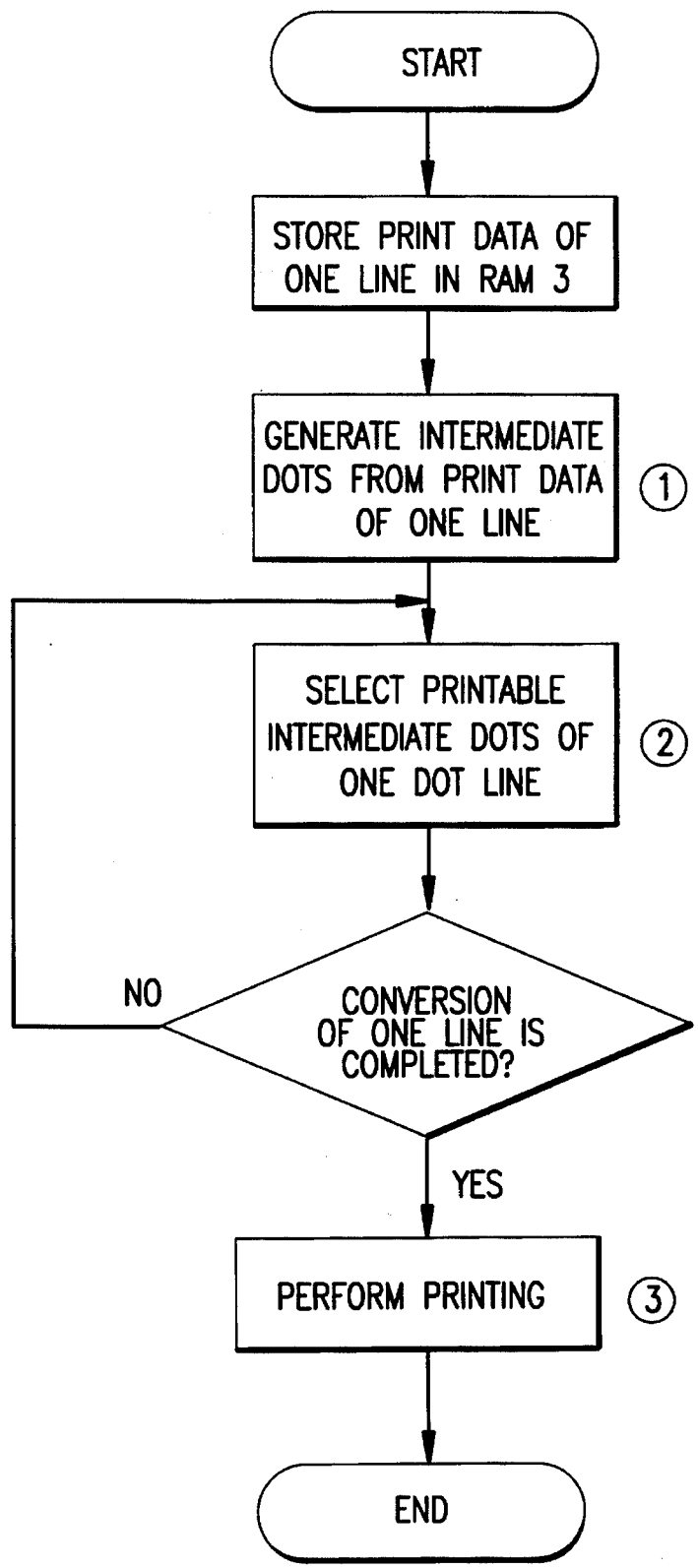
FIG. 8 is a flowchart showing a second operation mode of the system shown in FIG. 1.

A second embodiment of the, process of converting the original dot pattern by the control circuit 4 will be described with reference to the flowchart of FIG. 8.

Assume that the dot data representative of one dot line of the original dot pattern: is stored in the RAM 3 in developed form as shown in FIG. 9(*a*). With respect to each dot, first, four intermediate dots are generated and stored successively (step 1) as shown in FIG. 9(*b*).

Then, only dots from the intermediate dots that are present at dot positions spaced from the first dot position by an integral multiple of a dot interval 1.5 times longer than usual are selected, and the other intermediate dots are removed. As a result, successive dots from the dot data representative of one dot line shown in FIG. 9(*a*) are converted into those arranged at dot intervals of 1.5 times longer than usual (step 2). as shown in FIG. 9(*c*).

When the pattern of all dot lines is converted entirely, the print head is scanned on the basis of the thus converted dot data at a speed 1.5 times faster than usual, so that the printing elements such as printing wires are driven at the maximum response frequency of usual printing (step 3).

In this way, letters and the like designated by the print character designating means i are printed at a speed 1.5 times faster than usual.

A printed example of the secondary dot pattern obtained by converting the original dot pattern shown in FIG. 4 in accordance with the second embodiment is identical with the printed example of the first embodiment shown in FIG. 5.

Although the second embodiment converts the pattern in such a manner that only dots out of the intermediate dots that are arranged at dot intervals of 1.5 times longer than usual are selected, conversion may be performed in such a manner that when no intermediate dot is present at some successive dot positions as shown in FIG. 10, a then-appearing intermediate dot is retained there, and only dots from the subsequent intermediate dots that are arranged at dot intervals of 1.5 times longer than usual are selected.

Although the processes described above with reference to FIGS. 9 and 10 select dots arranged at dot intervals of 1.5 times longer than usual, dots arranged at dot intervals of 1.25 or 1.75 times longer than usual may be selected. For example, in FIG. 9, every 5th, intermediate dot may be selected instead of every 6th intermediate dot; in this case, the scanning speed of the print head is increased to 1.25 times faster than usual so that printing can be attained at a speed 1.25 times faster than usual. Similarly, every 7th intermediate dot may be selected instead of every 6th intermediate dot; in this case, the scanning speed of the print head is increased to 1.75 times faster than usual so that printing can be attained at a speed 1.75 times faster than usual.

Although each of the foregoing embodiments converts one dot into four successive intermediate dots, by giving an adequate storage capacity to the RAM 3, one dot can be converted into n (n≧2) intermediate dots; in this case, when there are 2n or moire successive intermediate dots, by selecting every m $\{(2n-1) \geq_m \geq (n+1)\}$-th intermediate dot and increasing the scanning speed of the print head to K (1<K <2) times, preferably K =m/n, printing can be attained at a speed of K times faster.

Figure 11:
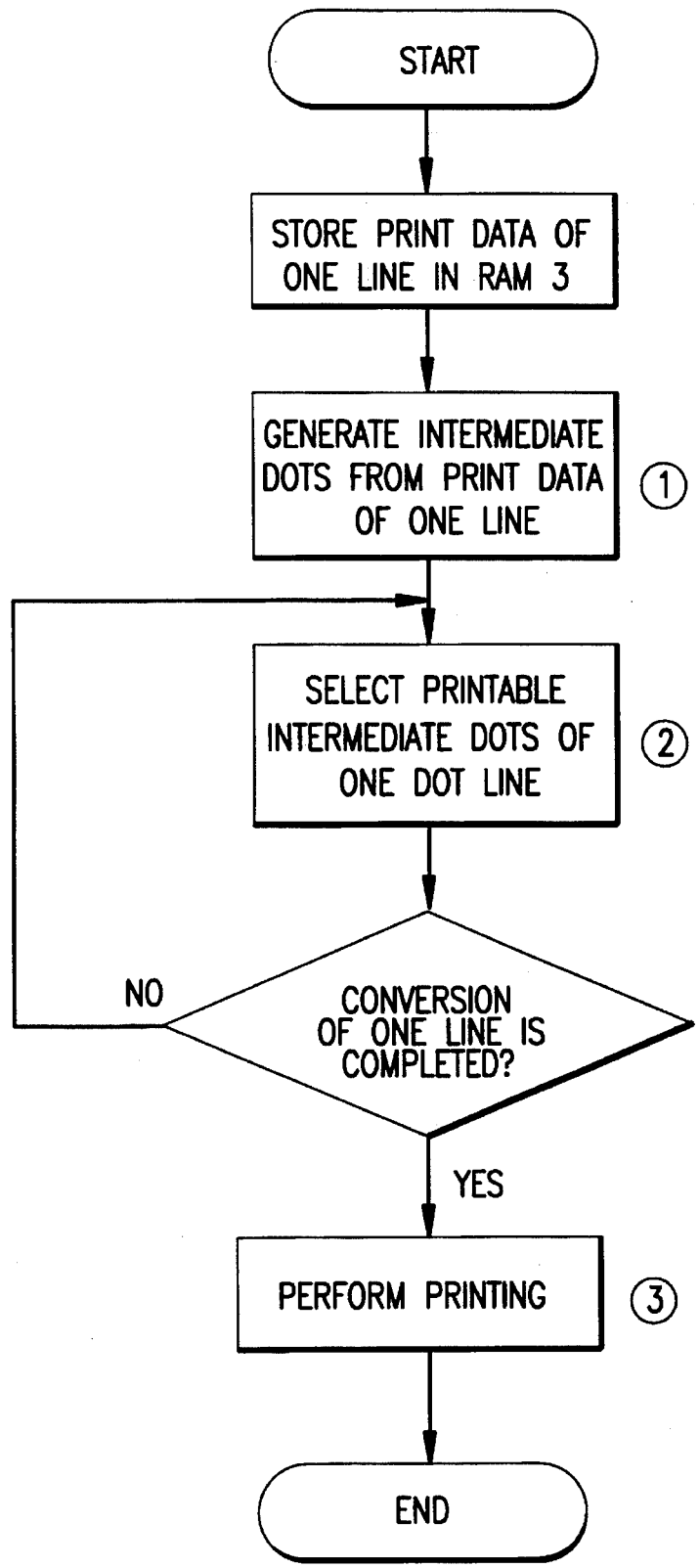
FIG. 11 is a flowchart showing a third operation mode of the system shown in FIG. 1.

A third embodiment of the conversion of the pattern of the original dot pattern by the control circuit will now be described with reference to the flowchart of FIG. 11.

Generally, the maximum response frequency of the printing elements such as wire pins is determined by the condition that all dots of one line are successively printed, and the usual scanning speed of the print head is determined such that the character will be printed optimally when the printing elements are driven at that maximum response frequency. Practically, however, where only two or three successive dots are to be printed, the printing elements can be driven at a response frequency higher than the maximum response frequency. This embodiment is based on the assumption that the printing means 5 can print the last one of successive dots, i.e. two successive dots, at a response frequency 1.5 times higher than usual, and intends to improve the printing quality by making use of the foregoing property.

Assume that the dot data representative of one dot line of the original dot pattern is stored in the RAM 3 in developed form as shown in FIG. 12(*a*). First, each dot is converted to two successive intermediate dots (step 1) as shown in FIG. 12(*b*).

Then, the first intermediate dot is selected, and a check is made to determine whether or net the number x of successive intermediate dots subsequent to the thus selected dot meets the condition: $n \leq x \leq 2n-1$ (n is the number of intermediate dots generated on the basis of one original dot; $n = 2$ in this example). When the condition is fulfilled, i.e. when there is only one dot which can be successively selected, printing can be performed at a response frequency of 1.5 times higher than usual; therefore, a dot present at a dot position spaced from the first dot position by the same dot interval as that of the original dot pattern (a dot d1 in FIG. 12(c)) is selected. On the other hand, when $x \geq 2n$, i.e. when there are two or more dots which can be successively selected, since the usual response frequency is used for driving, intermediate dots present at dot positions spaced from each other by a dot interval 1.5 times longer than usual (a dot d1 in FIG. 12(c)) are selected. In this way, all dots except the thus selected dots are removed; consequently, the dot data representative of one dot line shown in FIG. 12(a) is converted into the arrangement of FIG. 12(c) (step 2).

When the pattern of all dot lines is converted entirely, the print head is scanned on the basis of the thus converted dot data at a speed 1.5 times faster than usual, so that the printing elements such as printing wires are driven at the maximum response frequency of usual printing, or at a response frequency 1.5 times higher than the maximum response frequency, to attain print (step 3).

In this way, letters and the like designated by the print character designating means 1 are printed at a speed 1.5 times faster than usual.

Figure 13A:
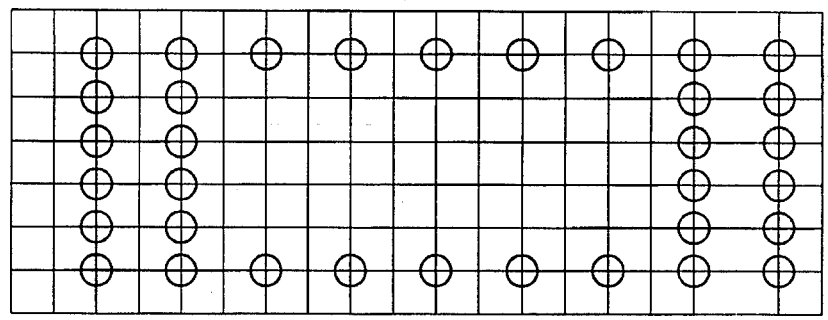
FIGS. 13 and 14 are diagrams each showing original dot patterns, printed examples based on the second embodiment, and printed examples based on the third embodiment, respectively.
Figure 13B:
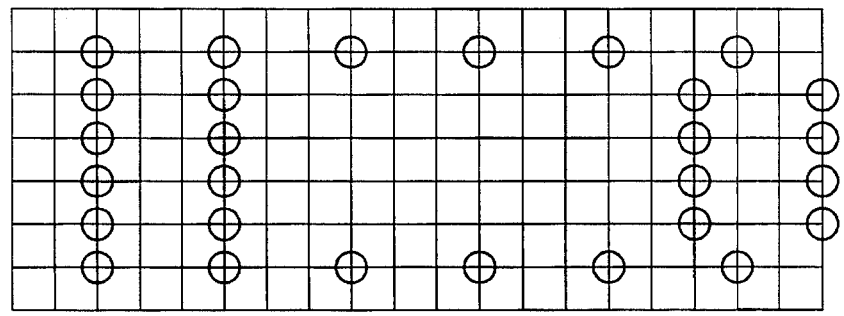
Figure 13C:
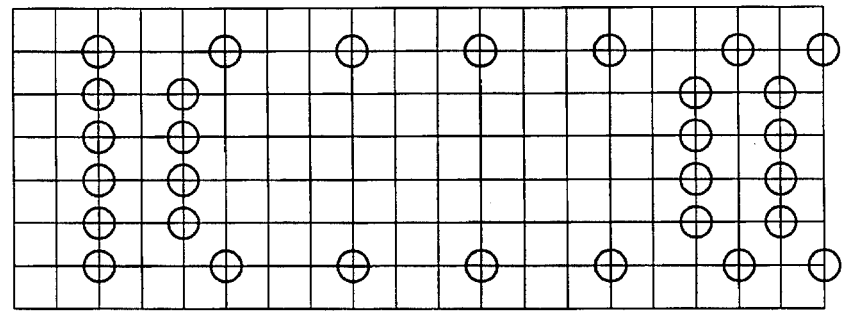

For illustrative purposes, FIG. 13(a) shows an original dot pattern, (b) shows a secondary dot pattern obtained by converting the original dot pattern (a) in accordance with the second embodiment, and (c) shows a secondary dot pattern obtained by converting the original dot pattern (a) in accordance with the third embodiment. The secondary dot pattern (b) has bold vertical lines as compared with the original dot pattern (because the dot interval is increased to 1.5 times) and its right upper and lower portions are slightly distorted; but, such points are improved in the pattern (c), or the pattern (c) is closer to the original dot pattern.

Figure 14A:
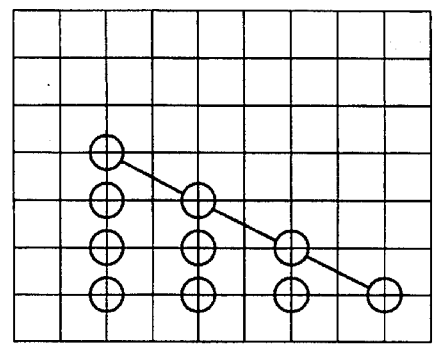
Figure 14B:
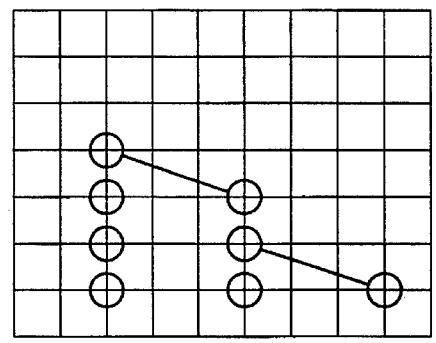
Figure 14C:
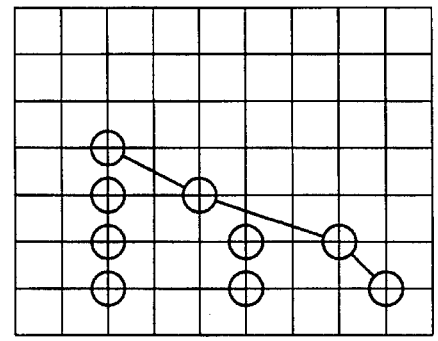

Further, FIG. 14(a) shows an original dot pattern, (b) shows a secondary dot pattern obtained by converting the original dot pattern (a) in accordance with the second embodiment, and (c) shows a secondary dot pattern obtained by converting the original dot pattern (a) in accordance with the third embodiment. The secondary dot pattern (b) has distorted oblique lines as compared with the original dot pattern; but, such points are improved in the pattern (c), or the pattern (c) has smooth oblique lines as is the case of the original dot pattern.

Figure 15:
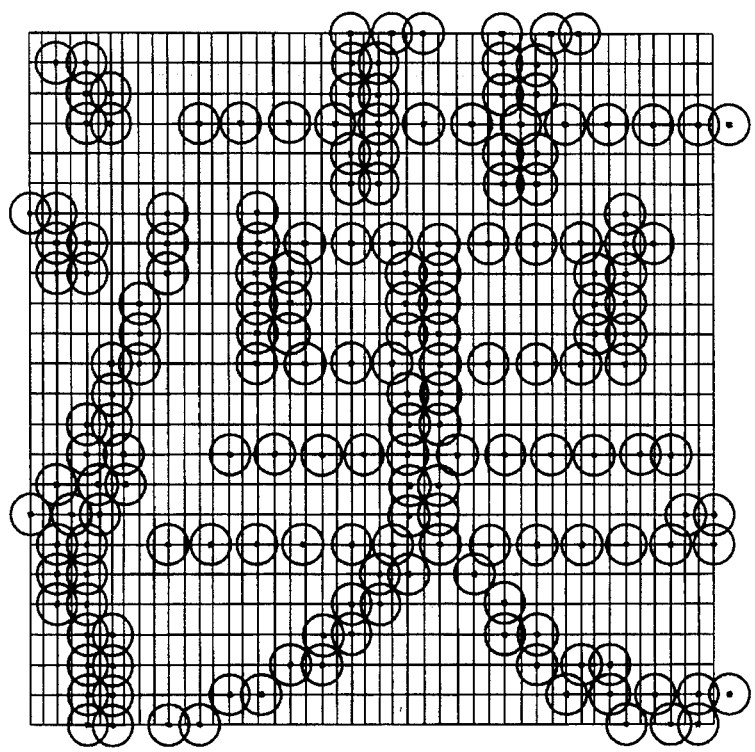
FIG. 15 is a diagram showing a printed example based on the third embodiment.

FIG. 15 shows a printed example of a secondary dot pattern obtained by converting the original dot pattern shown in FIG. 4 in accordance with the third embodiment.

Although the third embodiment converts each dot of the original dot pattern to two intermediate dots, as shown in FIGS. 16(a) and (b), each dot of the original dot pattern may be converted to four intermediate dots. In this case, as shown in FIG. 16(c), in response to the maximum response frequency of the printing elements attained in successive dot printing of short period, only dots out of successive intermediate dots that are present at dot positions spaced from the first dot position by an integral multiple of a dot interval 1.25 or 1.75 times longer than usual are selected. When the number x of successive intermediate dots subsequent to the thus selected dot meets the condition: $n \leq x \leq 2n-1$ (n =4 in this example), a dot present at a dot position spaced from that dot position by the same dot interval as that of the original dot pattern is selected. Consequently, it is possible to attain printing at a speed 1.25 or 1.75 times faster than usual by increasing the scanning speed of the print head to 1.25 or 1.75 times faster than usual.

Although the third embodiment makes it possible for the printing means 5 to print two successive dots at a response frequency higher than the usual maximum response frequency, it is also possible to print three or more successive dots at a response frequency higher than the usual maximum response frequency. For this purpose, proper intermediate dots compatible with such performance will be selected.

Although each of the foregoing embodiments stores the dot data representative of one line in the RAM 3 in developed form, the dot data representative of one character may be stored.

Although each of the foregoing embodiments converts the pattern after storing the dot data representative of the original dot pattern in the RAM 3 in developed form, conversion may be performed while the dot data representative of the original dot pattern is being read from the original dot pattern storage circuit 2; in this case, only the dot data representative of the converted dot pattern may be stored in the RAM 3 in developed form.

According to the present invention, the printing speed can be increased with little deterioration in printing quality. The invention makes it possible to print the original dot pattern in the form of a dot pattern closer thereto with little degradation of the printing quality.

What we claim is:

1. A method for printing wherein a printhead is successively scanned in a line direction to print a plurality of dots extending in said line direction, and a recording medium is fed at right angles to said line direction, comprising the steps of:

receiving and storing in a memory original dot data representative of an original dot pattern for a given line, in said line direction, said original dot pattern including one of fonts and graphics;

said original dot data being representative of the original dot pattern having individual original dots spaced from a preceding individual original dot by integer multiples of a minimum interval $d_1$;

converting each portion of said original dot data representative of said individual original dots and blanks into a portion of secondary dot data representing $n (n \geq 2)$ secondary dots and blanks respectively, arranged in the line direction in the given line;

said portions of second dot data representing said second dots and spaced by secondary intervals equal to $d_1/n$, and occupying intervals $d_1$ of said given line having a position associated with respective ones of said individual original dots in said given line;

storing said portions of secondary dot data in said memory in locations corresponding to associated positions in said given line;

selecting ones of said secondary dot data representing dots occurring adjacent every $m^{th}$ one of said secondary intervals in said given line wherein n and m are integers, $(2n-1) \geq_m \geq (n+1)$, and said selected $m^{th}$ ones of said secondary dots having a minimum selected interval $d_2$ between said selected dots, wherein $d_2 = m/n \times d_1$;

storing in said memory secondary dot data for said given line representing blanks in memory locations associated ones of said secondary dot data which are not selected; and printing using said secondary dot data the selected ones of said secondary dots.

2. The method for printing according to claim 1 wherein said step of printing further comprises scanning the printhead in the line direction at a speed faster than a speed used when printing using said original dot 3. A method for printing by scanning a printhead in a line direction, and feeding a recording medium at right angles to the line direction, comprising the steps of:

receiving and storing original dot dam representative of original dots of a line, in said line direction of a given line, of an original dot pattern, wherein said original dot pattern has an original minimal interval;

converting said original dot pattern into secondary dot data representing n consecutive secondary dots for each of said original dots of said original dot pattern, respectively, wherein n is an integer and said secondary dot data has said n consecutive secondary dots at a minimum secondary intervals equal to 1/n times the original minimal interval;

said secondary dot data representing said n secondary consecutive dots occupying the original minimal interval in said given line associated with respective ones of said original dots of said original dot data;

selecting from said secondary dot data data representing every $m^{th}$ one of said intervals when 2n or more of said dots of said secondary data are successive in said given line wherein $[m>n](2n-1) \geq m \geq (n+1)$ and m is an integer; and printing using the thus selected secondary dot data.

4. A method for printing with a dot printer having a printhead movable in a line direction and means for moving a recording medium in a direction at right angles with respect to said line direction, said method comprising the steps of:

a) receiving original print data which represents an original dot pattern;

b) converting the original print data to represent a print dot pattern in which a minimum interval spacing of two successive dots in the line direction is larger than a corresponding interval distance d in the original dot pattern, wherein said step of converting comprises:

b1) converting original print data representing each dot of the original dot pattern of a given line into intermediate print data representing n secondary successive dots in the line direction space at intervals of a distance of d/n, wherein $n \geq 2$, and occupying in the given line an interval distance d associated with the dot of the original dot pattern; and b2) selecting data of said intermediate print data representing the first and every m-th following secondary dot out of a series of 2n or more successive dots at an interval spacing of d/n, and selecting data representing one secondary dot out of a series of no more than n secondary successive dots at given interval spacing of d/n, as converted data representing dots of said print dot pattern, wherein $$2n-1 \geq m \geq n+1$$

and m and n are integers; and c) controlling the printhead with said converted data representing said print dot pattern to effect printing.

5. The method of claim 4 wherein step b2 includes selecting said one secondary dot, out of a series of no more than n successive secondary dots at a distance of d/n, such that said one secondary dot is separated by a distance equal to multiple of (m/n . d) from other selected dots of the print dot pattern.

6. A method for printing with a dot printer having a print head movable in a line direction relative to a recording medium and at right angles to an advancing direction of said recording medium, said method comprising the steps of:

receiving original dot data which represent an original dot pattern having dots provided in said line direction that are spaced at original intervals having a minimum distance $d_1$;

converting the original dot pattern by convening each portion of said original dot data representing a dot into secondary dot data representing $n(n \geq 2)$ successive secondary dots arranged in uniform intervals in positions within an interval of said minimum distance $d_1$ associated with each respective original dot data wherein n is an integer;

selecting data of said secondary dot data representing a first dot and each $m^{th}$ dot following said first dot in a continuous string of successive dots so long as 2n or more successive dots follow a presently selected dot, where is defined by $(2n-1) \geq m \geq (n+1)$ and selecting data representing a dot distance from a presently selected dot by said distance $d_1$ when x successive dots remain in said continuous string where x is defined by $n \leq x \leq (2n-1)$; and scanning the print head at a speed $V_2$ which is faster than a scanning speed $V_1$, wherein $V_1$ is a scanning speed when printing by the original dot pattern, and printing using the thus selected secondary dot data.

7. The method according to claim 6 wherein the minimum distance between the printed dots of the selected secondary dot data is equal to $d_2$, wherein $d_2 = d_1 \cdot V_2/V_1 = (m/n)d1$.

8. A method for printing characters and graphics by means of a dot printer having a print head movable in a line direction relative to a recording medium, said method comprising the steps of:

receiving original dot data which represents an original dot pattern having dots provided in said line direction at a minimum interval distance $d_1$;

converting the original dot pattern by converting each bit of original dot data representing an original dot into secondary dot data representing $n(n \geq 2)$ successive secondary dots in the interval of the original dot;

selecting desired portions of said secondary dot data representing secondary dots at an interval distance $d_2$ ($d_2 > d_1$); and scanning the print head at a speed $V_2$ which equals to $V_1 \cdot d_2/d_1$, wherein $V_1$ is a scanning speed when printing is performed by the original dot pattern and printing is performed using the thus selected secondary dot data.

9. A method for printing fonts and graphics by means of a dot printer having a print head movable in a line direction relative to a recording medium and at right angles to an advance of the recording medium, wherein the print head is scanned at a speed V1 in normal print mode and a distance d1 is a minimum interval of printed dots in said normal mode, said method comprising the steps of;

receiving original dot dam representing an original dot pattern for printing in said normal printing mode;

converting the original dot pattern by converting each original dot data into $n(n \geq 2)$ successive secondary dot data for use in a high speed printing mode;

selecting desired secondary dot dam;

scanning the print head at a speed V2(V2 >V1) and printing using the thus selected secondary dot data to print dots in said line direction while keeping a minimum interval d2, (d2=d1*V2/V1), in said high speed printing mode.

10. A method for printing wherein a print head is successively scanned in a line direction to print a plurality of dots extending in said line direction and a recording medium is fed at right angles to said line direction, the method comprising the steps of;

receiving original dot data representative of an original dot pattern to print dots in said line direction;

converting each original dot data into secondary dot data representative of a secondary dot pattern having a dot density in said line direction greater than said original dot pattern;

selecting desired secondary dot dam, wherein the selected secondary dot data represents a third dot pattern having a dot density in said line direction less than said dot density of said original dot pattern; and scanning the print head at a speed higher than a normal speed for printing said original dot pattern and printing using the thus selected secondary dot data.

* * * * *